United States Patent
Kondo et al.

(10) Patent No.: US 6,519,656 B2
(45) Date of Patent: *Feb. 11, 2003

(54) METHOD FOR DATA TRANSMISSION WITH A LIST OF AUXILIARY INFORMATION BY APPENDING A CORRESPONDING ID CODES WITH RESPECTIVE AUXILIARY INFORMATION

(75) Inventors: Satoshi Kondo, Kyoto; Kenji Muraki, Osaka; Jiro Yamada, Kyoto, all of (JP)

(73) Assignee: Matsushita Electric Industrial Co., Ltd., Osaka-fu (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,002

(22) Filed: Mar. 16, 1999

(65) Prior Publication Data

US 2002/0152337 A1 Oct. 17, 2002

(30) Foreign Application Priority Data

Mar. 17, 1998 (JP) .......................... 10-066613
Aug. 18, 1998 (JP) .......................... 10-231685

(51) Int. Cl.$^7$ .......................... G06F 3/00; G06F 13/28
(52) U.S. Cl. .......................... 710/6; 710/20; 710/30
(58) Field of Search .......................... 710/5.6, 20, 30; 369/275.3, 48, 58; 380/5

(56) References Cited

U.S. PATENT DOCUMENTS

| | | | |
|---|---|---|---|
| 5,587,979 A | | 12/1996 | Bluthgen |
| 5,687,160 A | | 11/1997 | Aotake et al. |
| 5,732,067 A | * | 3/1998 | Aotake .................... 369/275.3 |
| 5,745,454 A | * | 4/1998 | Yokota ....................... 369/48 |
| 5,825,731 A | * | 10/1998 | Yokota ....................... 369/48 |
| 5,974,220 A | * | 10/1999 | Kajimoto ..................... 386/52 |
| 5,987,126 A | * | 11/1999 | Okuyama et al. ............... 380/5 |
| 6,104,684 A | * | 8/2000 | Moriyama et al. ............ 369/58 |
| 6,223,302 B1 | * | 4/2001 | Nakamura et al. ............. 714/8 |
| 6,262,965 B1 | * | 7/2001 | Shimbo et al. .......... 369/275.3 |

FOREIGN PATENT DOCUMENTS

| | | |
|---|---|---|
| EP | 0464482 | 1/1992 |
| EP | 0467587 | 1/1992 |
| EP | 0798723 | 10/1997 |
| EP | 0833514 | 4/1998 |
| JP | 401273276 A * | 11/1989 |
| JP | 09120666 | 5/1997 |
| WO | 95/16262 | 6/1995 |
| WO | 96/16406 | 5/1996 |
| WO | 99/06997 | 2/1999 |

OTHER PUBLICATIONS

Disc Model Ver 1.00FC.
AV/C Digital Interface Command Set General Specification, Rev. 3.0, Apr. 15, 1998, 1998003.
Enhancements to the AV/C General Specification 3.0 Version 1.OFC1, Nov. 5, 1998, 1998010.
"AV/C Digital Interface Command Set General Specification", Version 3.0 1394 Trade Association, Apr. 15, 1998, pp. 20–34, 49–60.
"AV/C Disc Subunit General Specification", Version 1.0 1394 Trade Association, Jan. 26, 1999, pp. 55–81, 99–101.

* cited by examiner

Primary Examiner—Thomas Lee
Assistant Examiner—Chun Cao
(74) Attorney, Agent, or Firm—Wenderoth, Lind & Ponack, L.L.P.

(57) ABSTRACT

In a data transmission apparatus, a list generator produces a list of auxiliary information by appending a corresponding ID code to each item of the auxiliary information, based on a table of the ID codes previously assigned to the items of the auxiliary information, to thereby access a desired auxiliary information content in the list with reference to the ID code appended thereto.

26 Claims, 10 Drawing Sheets

Fig.2A

LIST 201
| ENTIRE DISK ATTRIBUTES | ~202 |
| NUMBER OF MUSICS | ~203 |
| ATTRIBUTES OF MUSIC (a) | ~204 |
| ATTRIBUTES OF MUSIC (b) | ~205 |
| ATTRIBUTES OF MUSIC (c) | ~206 |

Fig.2B

LIST 210
| NUMBER OF ATTRIBUTES | ~211 |
| ID OF 1ST ATTRIBUTE | ~212 |
| 1ST ATTRIBUTE | ~213 |
| ID OF 2ND ATTRIBUTE | ~214 |
| 2ND ATTRIBUTE | ~215 |
| ID OF 3RD ATTRIBUTE | ~216 |
| 3RD ATTRIBUTE | ~217 |
| ID OF 4TH ATTRIBUTE | ~218 |
| 4TH ATTRIBUTE | ~219 |

Fig.2C

| ID | CONTENTS OF ATTRIBUTES |
|---|---|
| 1 | REPRODUCTION TIME |
| 2 | RECORDED DATE/TIME |
| 3 | TITLE |
| 4 | NAME OF PLAYER |
| 5 | NAME OF COMPOSER |
| 6 | CATEGORY |

Fig.3A

| | |
|---|---|
| NUMBER OF ATTRIBUTES=4 | ~231 |
| ID OF 1ST ATTRIBUTE (=1) | ~232 |
| REPRODUCTION TIME | ~233 |
| ID OF 2ND ATTRIBUTE (=3) | ~234 |
| TITLE | ~235 |
| ID OF 3RD ATTRIBUTE (=4) | ~236 |
| NAME OF PLAYER | ~237 |
| ID OF 4TH ATTRIBUTE (=6) | ~238 |
| CATEGORY | ~239 |

| | |
|---|---|
| NUMBER OF ATTRIBUTES=4 | ~231 |
| ID OF 2ND ATTRIBUTE (=3) | ~234 |
| TITLE | ~235 |
| ID OF 4TH ATTRIBUTE (=6) | ~238 |
| CATEGORY | ~239 |
| ID OF 3RD ATTRIBUTE (=4) | ~236 |
| NAME OF PLAYER | ~237 |
| ID OF 1ST ATTRIBUTE (=1) | ~232 |
| REPRODUCTION TIME | ~233 |

| ID |
|---|
| DATA LENGTH |
| ENTIRE TIME |
| ID |
| DATA LENGTH |
| TITLE |
| ⋮ |

Fig.4B

| ID |
|---|
| DATA LENGTH |
| TIME |
| ID |
| DATA LENGTH |
| TITLE |
| ID |
| DATA LENGTH |
| NAME OF PLAYER |
| ⋮ |

Fig.6A

| LIST 501 | |
|---|---|
| ID OF 1ST STATUS INFO. (=11) | ~502 |
| OPERATION STATUS | ~503 |
| ID OF 2ND STATUS INFO. (=12) | ~504 |
| REPRODUCTION POSITION | ~505 |
| ID OF 3RD STATUS INFO. (=13) | ~506 |
| REPRODUCTION METHOD | ~507 |
| ID OF 4TH STATUS INFO. (=14) | ~508 |
| RECORDING POSITION | ~509 |
| ID OF 5TH STATUS INFO. (=15) | ~510 |
| RECORDING METHOD | ~511 |

Fig.6B

| ID | CONTENTS OF STATUS INFO. |
|---|---|
| 11 | OPERATION STATUS |
| 12 | REPRODUCTION POSITION |
| 13 | REPRODUCTION METHOD |
| 14 | RECORDING POSITION |
| 15 | RECORDING METHOD |

Fig.6C

| LIST 521 | |
|---|---|
| ID OF 1ST STATUS INFO. (=11) | ~502 |
| OPERATION STATUS | ~503 |
| ID OF 2ND STATUS INFO. (=12) | ~504 |
| REPRODUCTION POSITION | ~505 |
| ID OF 3RD STATUS INFO. (=13) | ~506 |
| REPRODUCTION METHOD | ~507 |

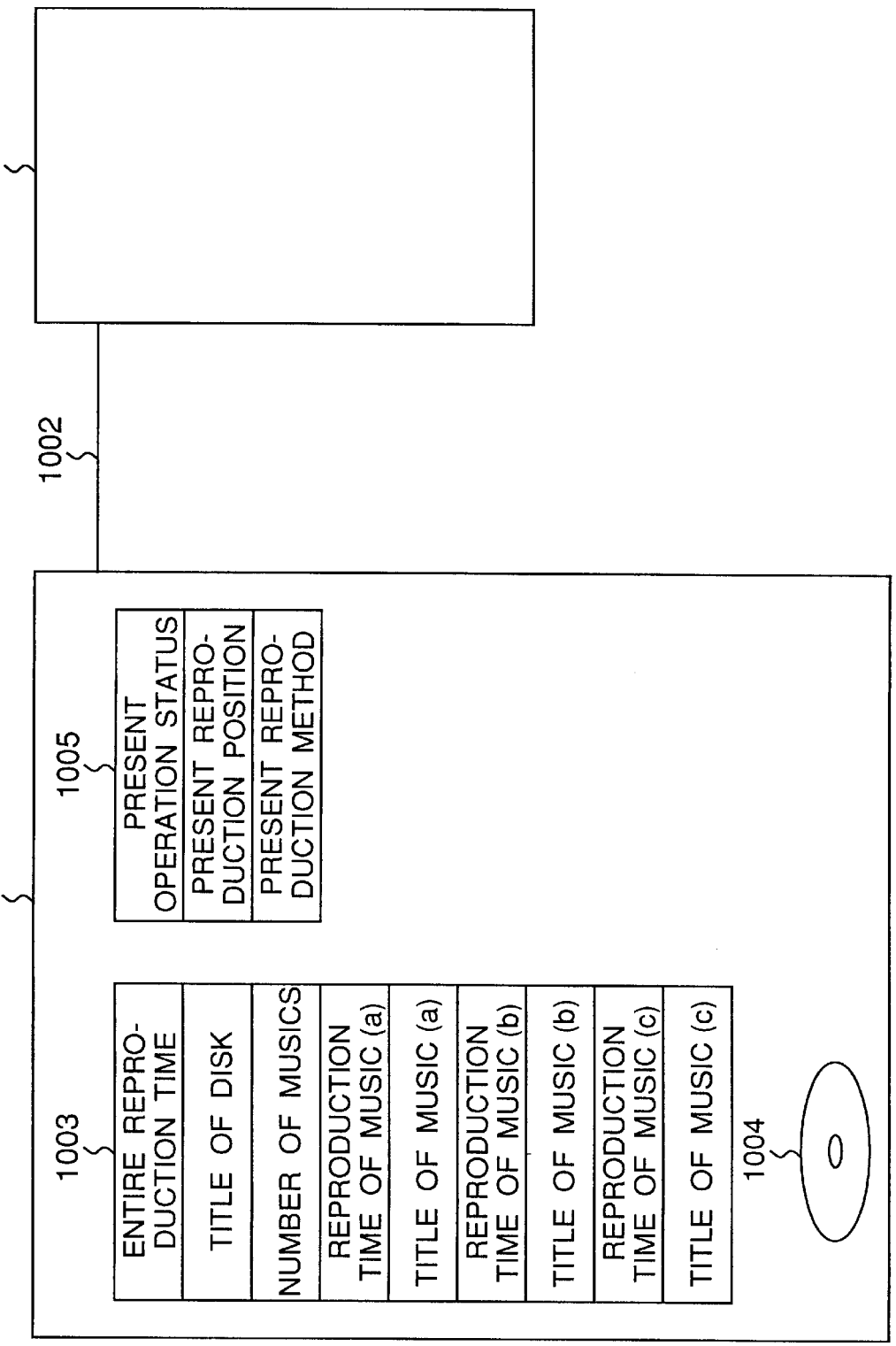

METHOD FOR DATA TRANSMISSION WITH A LIST OF AUXILIARY INFORMATION BY APPENDING A CORRESPONDING ID CODES WITH RESPECTIVE AUXILIARY INFORMATION

BACKGROUND OF THE INVENTION

1. Field of the Invention

The present invention relates to a data transmission apparatus and a method thereof for sending and receiving data recorded on a recording medium such as an optical disk, magnetic tape and the like, to and from an external equipment via a digital interface such as IEEE 1394 Standard, using a command adapted thereto.

2. Description of the Prior Art

Recently, usage of IEEE 1394 Standard has been increased in a serial data transmission system. The IEEE 1394 system can be used not only for transmission of computer data which is conventionally conducted by a SCSI system or the like, but also used for transmission of substantive audio and/or video (referred to as "AV", hereinafter) data to be processed by an AV equipment. This is because the IEEE 1394 system has two communication methods defined therein, i.e., an isochronous data transmission system and an asynchronous data transmission system.

The isochronous communication is a data transmission method which can be used for transmitting data, such as substantive AV data, requiring a real time property. In this method, a frequency band required for the data transmission is previously obtained prior to the start of the data transmission, and then the data transmission is conducted using the band. By this arrangement, the real time property of the data transmission can be assured.

Meanwhile, the asynchronous communication is a data transmission method using a free time for transmitting auxiliary data such as command or computer data and the like data which does not require a real time property. This communication method can be regarded as equivalent to a conventional SCSI method.

Various standards are proposed as a host transmission protocol on the IEEE 1394 system, and IPC 61883 standard is used as one of the methods. The IEC 61883 standard specifies such as a method of sending and receiving AV data requiring real time property in an isochronous communication system, and also specifies a method of sending and receiving a command to be given to an AV equipment in an asynchronous communication system.

A set of AVIC commands and responses are transported by Function Control Protocol (FCP) defined by IEC 61883. FCP provides a simple means to encapsulate commands and responses within IEEE 1394. The scope of the present invention field is within the AV/C commands and responses defined by IEC 61883. The format of an FCP frame encapsulated within a Serial Bus block packet is shown in FIG. 8.

As shown in FIG. 8, the format of FCP frame is encapsulated within a Serial Bus packet where one rank i.e. one quadrate corresponds to 32 bits and the first five ranks (i.e., first five quadrates) are used as a header of a packet in the asynchronous system on IEEE 1394 Standard, and the following "cts" and FCP data fields are subsequently transmitted. In this format, destination ID, source ID, and the like fields are defined where the cts field defines the command transaction format used by the FCP frame. Commands originated by a device at a serial bus node (i.e., a controller) are addressed to the FCP COMMAND register (i.e., destination_offset) at the serial bus node that contains the device to be controlled (i.e., the target). The data payload of both FCP request and response packets, specified by data_length, is limited to a maximum of 512 bytes.

FIG. 9 shows a structure of an AV/C command frame which is up to 512 bytes of command payload. The AV/C commands and responses are encapsulated within FCP frames and are transmitted between the controller and target FCP_COMMAND and FCP_RESPONSE registers. In this command frame structure, a "ctype" 1 field is defined for indicating a command type as to whether the command is a control one or an inquiring one. The subunit_type and subunit_ID fields are defined for identifying a type of an AV equipment and the subsequent opcode and operands [0] to [n] indicate an actual command such as PLAY, STOP, RECORD and the like. All of the operands are optional and defined by ctype, subunit_type and opcode.

In the case where a compact disk or mini disk is used as a data recording medium in a disk drive unit for recording and reproducing substantive data such as, for example, audio (and/or video) data, the disk is also provided with auxiliary attributive information as well as the substantive audio (and/or video) data recorded thereon.

As shown in FIG. 10, the attributive information is recorded in a TOC (Table-Of-Contents) region of a compact disk or in a UTOC region of a mini disk.

In the case of audio data such as music recorded in a disk, the attributive information includes a start address and end address of the music data, title of music, recorded date/time of the music data and the like information. There is no defined method of transmitting such attributive information in the serial data transmission on the EEC 61883 standard. Therefore, in the conventional data transmission system, there are proposed a method of storing the attributive information in a data format of a list structure and a method of accessing the listed attributive information from an external equipment.

FIG. 11 shows an example of the conventional data transmission system of storing and accessing the listed attributive information. In this example, a data transmission apparatus 1000 having, e.g., an optical disk 1004 loaded therein is electrically connected to an external equipment 1001 via a digital interface 1002, where the optical disk 1004 is provided with substantive AV data and attributive information data of the AV data recorded thereon. The attributive data includes data number of the AV data (which indicates the number of musics when the AV data is music audio data), total reproduction time, reproduction time of individual AV data, title of the disk, titles of AV data, and the like.

When the optical disk 1004 is loaded on the apparatus 1000, the attributive information such as data number of the AV data, total reproduction time, reproduction time of each AV data, each title and the like data are reproduced and stored as an attributive information list illustrated as a first list 1003 in a register storage portion of the apparatus.

Meanwhile, status information indicating the present operation status of the apparatus 1000 such as reproduction or stop and the like, present reproduction position, present reproduction method such as normal reproduction or program reproduction and the like, are stored as a status information list illustrated as a second list 1005 in the register storage portion of the apparatus.

FIG. 12 shows a conventional example of a concrete data pattern format construction of the attributive information list 1003 having a structure of three class layers. In the first layer structure, a packet header is positioned at the top and the attributive information groups of the AV data (illustrated as first, second, third musics . . . ) are arranged below in turn. In the second layer structure, the packet header is comprised of header length indicating a specified byte length of the header and the entire attributive information contained in the disk while the attributive information group of each AV data is comprised of a data header including a data length and attributive information contents of each AV data.

As shown in the third layer structure, the entire disk attributive information is comprised of information blocks including an entire reproduction time, title of the disk, number of musics and the like, each having a specified byte length of e.g. four bytes while the attributive information contents of each AV data includes a reproduction time, title and the like of each AV data, each content having a data length of a specified bytes number.

On paying attention to the third stair layer structure of the data pattern format shown in FIG. 12, when an attributive information content such as, for example, a specific title of music, is desired to be accessed, the accessing must be conducted by designating the address position in bytes from the top position in the list. However, because the data pattern of the attributive information list is of a variable length format, the address position in bytes of the desired attributive information content is not always constant in the list.

In the construction shown in FIG. 11, when a user desires to input an attributive content, e.g. a title of disk into the optical disk 1004 in the apparatus 1000, the desired title is written onto the position of the title of disk in the attributive list 1003 in accordance with a command sent from the external equipment 1001 via the digital interface 1002. When the optical disk 1004 is ejected to the apparatus, the attributive information written into the desired region of the list 1003 is recorded in the corresponding region of the optical disk 1004. When the optical disk 1004 is loaded on an apparatus, a new attributive information list 1003 is produced in the apparatus based on the attributive information recorded on the optical disk 1004. When the attributive information such as reproduction time and title data recorded in the optical disk 1004 is desired to be obtained by the external equipment, the desired attributive information can be obtained by the external equipment 1001 via the digital interface 1002 by accessing the corresponding region in the first list 1003 within the apparatus 1000.

When the user desires to obtain the present operation status information of the apparatus 1000, the desired status information of the apparatus can be obtained by accessing to the status information list (i.e., illustrated as the second list 1005). For example, by reading out the present operation status information from the second list 1005, the user obtains the information as to in what status the apparatus is under operation at present, via the interface and via the external equipment 1001.

In the conventional system, however, since the contents of the attributive information and the arrangement order thereof in the first list 1003 are fixed, therefore when a new recording medium having new attributive information recorded therein is used in the apparatus in the future, a new attributive information list must be defined as exclusively dedicated for the medium.

Moreover, in the conventional method as described above, when accessing the attributive information contained in the first list 1003 for reading or writing, the accessing position in bytes must be designated from the top position in the list. Therefore, in the case where the attributive information is written into the first list 1003 for overwrite or insertion thereof by way of the external equipment, if an input of the information content is erroneously performed even in one byte position in the list, the resultant content is undesirably different from the exact content to be written. In this undesirable case of erroneous byte position, it is difficult for the external equipment to confirm the erroneous byte position in writing the desired information in the first list 1003 because the external equipment confirms the information list read out from the apparatus 1000 as a series of bytes sequence.

Furthermore, a byte position of a desired attributive information content in the list is varied every time the list is renewed. Therefore, when in accessing for writing attributive information, the present list of the attributive information must be first read to confirm the byte position of the desired attributive information content in the list prior to conducting the writing operation, which necessarily increases the processing amount of the operation. The conventional method has problems as described above.

SUMMARY OF THE INVENTION

The present invention has been developed to solve these problems inherent to the conventional data transmission apparatus, and an essential object of the present invention is to provide an improvement of a data transmission apparatus and method thereof using a specific command adapted thereto, which is capable of easily varying contents and arrangement order of auxiliary information contents in a list, and also capable of writing and reading the auxiliary information into and from a precise position when accessing thereto, whereby even when a list of the auxiliary information is renewed, it is not necessary to identify a byte position of the information in the list, and therefore a desired auxiliary information can be easily accessed by way of the same designation method, and whereby a user can obtain a list of attributive information contained in the recording medium or a list of status information of the apparatus by a simple construction and method.

In order to achieve the objects mentioned above, the present invention provides a data transmission apparatus for sending and receiving main data recorded on a recording medium to and from an external equipment via a digital interface based on command data sent from the external equipment, which the apparatus comprises:

an auxiliary information storage means for storing auxiliary information relating to a transaction of the main data; and a list producing means for producing a list of the auxiliary information by appending a corresponding ID code to each content of the auxiliary information group, based on a table of the ID codes previously assigned to the contents of the auxiliary information, to thereby access a desired auxiliary information content in the list with reference to the ID code appended thereto.

In this construction, the entire list of the auxiliary information includes a plurality of auxiliary information groups, each group having a data format construction including continuous plural pairs of auxiliary information contents and corresponding ID codes added thereto.

Another object of the present invention is to provide a data transmission method for sending and receiving main data recorded on a recording medium to and from an external equipment via a digital interface based on command data sent from the external equipment, which the method comprises the steps of:

storing auxiliary information relating to a transaction of the main data;

producing a list of the auxiliary information by appending a corresponding ID code to each content of the auxiliary information group, based on a table of the ID codes previously assigned to the contents of the auxiliary information; and accessing a desired auxiliary information content in the list with reference to the ID code appended thereto.

Further another object of the present invention is to provide command data adapted to the apparatus, wherein the command data, which is a command for accessing an auxiliary information content, includes an ID-code field indicating an ID code of the desired auxiliary information content to be accessed, whereby the desired auxiliary information content is identified in address position in the list and obtained by accessing.

By this arrangement, in the data transmission apparatus and method thereof according to the present invention, when the data recorded in the recording medium is transmitted between the apparatus and the external equipment, a list structure of the auxiliary information of transaction of the main data is used, which the list is produced by appending a corresponding ID code to each of the auxiliary information contents, the ID codes previously assigned to the contents of the auxiliary information group. When accessing the contents in the list, the ID codes are used as an accessing key for obtaining the desired auxiliary information. Therefore, even when an auxiliary information group is increased, the contents of the increased auxiliary information group can be easily accessed merely by defining the ID codes corresponding to the newly added contents while maintaining the essential structure of the list pattern format. Also, it is not necessary to fix the arrangement order in writing of the auxiliary information and the order in the list can be optionally modified.

Moreover, since the ID codes are used as the accessing key for the auxiliary information, it is not necessary to designate the address position in bytes from the top in the list as required in the conventional method, and therefore accessing an erroneous position in the list can be effectively avoided, which assures the precise access to the desired auxiliary information. Moreover, since the access to the auxiliary information is performed using ID codes as a searching key, it can be omitted to first read the list and identify the position in bytes of the desired information when in writing operation as required in the conventional method, and thus the processing amount of the data can be remarkably reduced.

In addition, in the data transmission apparatus of the present invention, when the auxiliary information such as attributive information recorded in the recording medium or status information of the operation condition of the apparatus is stored in a list structure, the list is produced by adding corresponding ID codes to actual auxiliary information contents. And the accessing to the auxiliary information list is performed using the ID codes as the accessing key, and therefore the reading and writing of the auxiliary information can be easily conducted.

Furthermore, when command data is transmitted from the external equipment to the apparatus for inquiring what kinds of auxiliary information contents are stored in the apparatus, the apparatus produces a list of the ID codes of the attributive and status information stored in the apparatus and then the produced list of the ID codes are transmitted to the external equipment as a response to the command. The inquiring operation can be performed with regard to not only the entire of the attributive and status information but also a part thereof, and the list of the ID codes of the desired attributive and status information is made in accordance with the range of the inquiring contents of the command.

As described above, even when a user desires to obtain as to whether or not the data transmission apparatus holds optional auxiliary information contents it is not necessary to directly read out all of the desired information contents. Accordingly, the auxiliary information list held in the apparatus can be easily obtained by way of the external equipment. Thus, the data processing amount of the apparatus and the external equipment can be reduced together with reduction of the traffic amount on the digital interface.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:.

FIGS. 2A, 2B and 2C are explanatory diagrams showing a typical attributive information list of the present invention;

FIGS. 3A and 3B are explanatory diagrams showing a typical list construction of the present invention;

FIGS. 4A and 4B are explanatory diagrams showing a typical data pattern format of a list;

FIGS. 6A, 6B and 6C are explanatory diagrams showing a typical status information list of the present invention;

FIG. 11 is an explanatory diagram showing a conventional data transmission system storing a list information.

DETAILED DESCRIPTION OF THE PREFERRED EMBODIMENT

Figure 1:
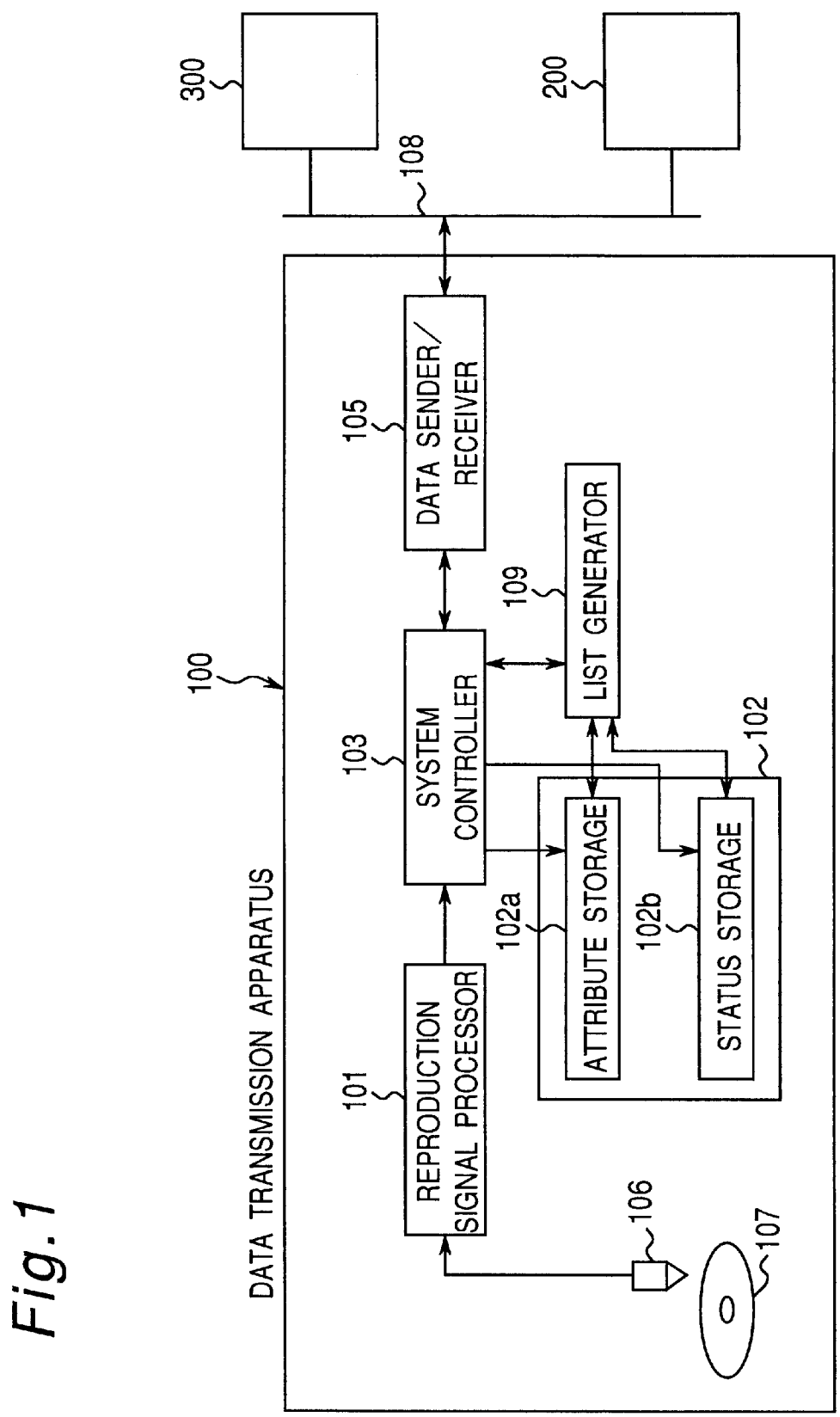
FIG. 1 is a block diagram of a data transmission apparatus according to the present invention.

Before the detailed description proceeds, it is noted that like parts are designated by like reference numerals throughout the accompanying drawings.

A preferred embodiment of a data transmission apparatus according to the present invention is described below with reference to the accompanying drawings. In the present embodiment, it is noted here that the explanation is made with regard to an example in the case where audio data is treated as an example of substantive main data and the apparatus is provided with a disk drive unit having an optical disk loaded therein as an example of a data recording medium.

Figure 8:
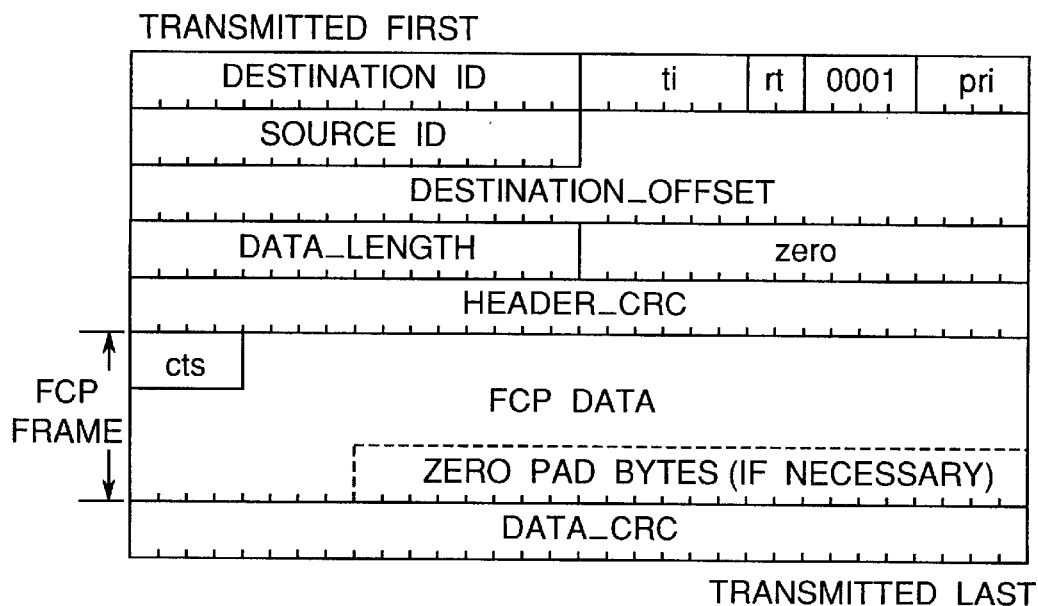
FIG. 8 is an explanatory diagram showing a format of FCP frame defined by IEC 61883.
Figure 9:
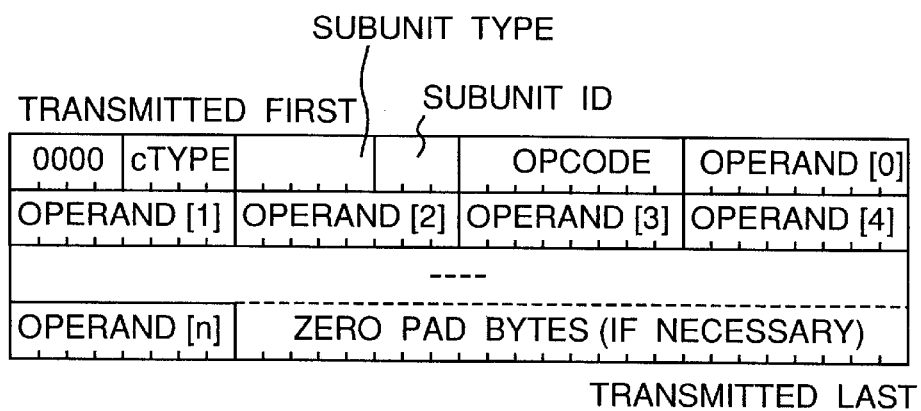
FIG. 9 is an explanatory diagram showing a structure of an AV/C command frame defined by IEC 61883.
Figure 10:
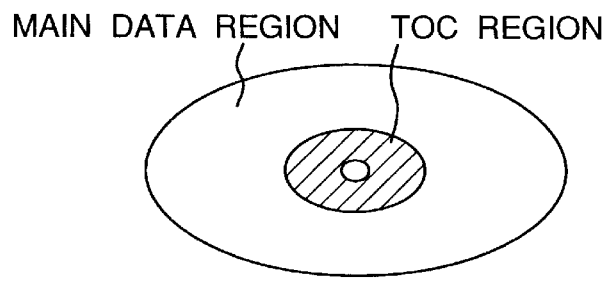
FIG. 10 is a schematic view showing data recording regions in a disk shaped medium.

Also, in this preferred embodiment of the present invention, it is noted that the scope of the present invention field is within the AV/C commands and responses defined by IEC 61883. The format of an FCP frame encapsulated within a Serial Bus block packet is similar to that of the conventional one shown in FIG. 8. In the present invention, the structure of an AV/C command frame is similar to that of the conventional one shown in FIG. 9 except that the opcode and operands [0] to [n] defined in the AV/C command structure indicate an actual command such as READ INFO BLOCK and the like.

FIG. 1 shows a schematic construction of a data transmission system according to the present invention, where a data transmission apparatus 100 includes a reproduction signal processor 101, an auxiliary data storage device 102 for storing auxiliary data relating to a transaction of the main data. The auxiliary data includes management information indicative of attributes of the main data and status information indicative of a present operation status of the apparatus 100. The apparatus further includes a system controller 103 for controlling all the parts of the apparatus, and a data sender/receiver 105 for sending and receiving various data to and from external equipment via a digital interface 108. The apparatus 100 further includes an optical head 106 adapted to an optical disk 107 serving as a recording medium loaded therein, and a list generator 109 for producing a list of the auxiliary information data. The auxiliary data storage device 102 is comprised of an attributive information storage unit 102a and a status information storage unit 102b. The apparatus 100 is interconnected to external equipment such as another data transmission apparatus 200, personal computer 300 and the like, via the digital interface 108 defined by e.g. IEEE 1394 Standard, so that the data transmission is conducted between the apparatus 100 and the external equipment.

The operation of the data transmission apparatus thus constructed is described below. In this embodiment, the explanation is made with regard to an example in the case where audio data such as music is recorded on the optical disk 107 as an example of the substantive main data and the attributive information of the audio data is also recorded on the optical disk 107 as an example of the auxiliary data.

In the construction shown in FIG. 1, when the optical disk 107 is loaded on the apparatus 100, the attributive information data recorded on the TOC region of the optical disk is reproduced through the optical head 106. The reproduced attributive information data is processed for demodulation and ECC decoding by the reproduction signal processor 101 and the resultant processed data is inputted to the system controller 103. Then the attributive information data inputted to the system controller 103 is applied to the attribute storage portion 102a in the auxiliary data storage portion 102 and held therein. The attributive information data to be stored in the attribute storage unit 102a includes information of entire reproduction time of the disk, title of the disk, number of audio data (i.e., number of musics), reproduction time of each audio data, title of each audio data, name of player, name of category of each audio data, and the like management information.

In the meanwhile, the status information indicative of the present operation condition of the apparatus 100 is stored in the status storage unit 102b under the control of the system controller 103. The status information to be held in the status storage unit 102b includes operation status information such as PLAY, RECORD, STOP, and present reproduction position or recording position indicative of e.g. music number or time (minute and second), present reproduction method (e.g., normal reproduction, program reproduction or the like), recording method (e.g., sampling frequency number, quantization bit number) and the like.

The following describes an operation in the case of reading out the auxiliary information, such as attributive information of the audio data, from the optical disk 107 or status information indicative of the present operation of the apparatus 100, through the external equipment via the digital interface 108. In this reading operation of the auxiliary information of the attributive or status information, the auxiliary information is developed in a list pattern format structure so that the list of the auxiliary information is accessed to be read, thereby obtaining the desired information contents.

In the first step, in the case where the data sender/receiver 105 of the apparatus 100 receives a data packet having a command for reading the attributive information of the audio data recorded in the optical disk 107 through the external equipment via the digital interface 108, the data sender/receiver 105 of the apparatus 100 analyzes a header of the packet. Then, the command for reading included in the packet is taken and inputted to the system controller 103. Upon receipt of the reading command by the system controller 103, the attributive information held in the attribute storage portion 102a is extracted and applied to the list generator 109. Upon receipt of the attributive information by the list generator 109, the attributive information is converted to a predetermined list format by appending ID codes to the attributive information contents, and then the produced list format of the attributive information is generated and applied to the system controller 103. The information list is then outputted from the system controller 103 and applied to the data sender/receiver 105 where the list format is made into a packet format by adding a header and the like for setting a destination address. Thus, the resultant information list contained in the packet format is transmitted to the external equipment via the digital interface 108.

FIGS. 2A and 2B show an example of the list structure of the attributive information produced by the list generator 109. FIG. 2A shows a model of a list construction 201 of the entire attributive information of the disk 107 in the case where the audio data of e.g. three pieces of music data a, b and c is recorded in the optical disk 107. As shown in FIG. 2A, the entire list construction 201 includes an item of entire disk attributes 202, number of musics 203, item 204 indicating attributes of Music a, item 205 indicating attributes of Music b, and item 206 indicating attributes of Music c.

In the entire list construction 201, every item except for the number of musics 203, i.e., each item 202, 204, 205 and 206 is developed as a list construction 210 in a general format as shown in FIG. 2B.

In this general format of the list construction 210 shown in FIG. 2B, every first to fourth attributive information item (213, 215, 217, 219) is added with a corresponding ID code (212, 214, 216, 218) to form a series of pairs of the ID codes in combination with the attributive information contents. In this explanation, the number of the items of the attributive information is four, and therefore four ID codes are added to the attributive information contents, which are represented by e.g. predetermined code numbers specified to the contents of the attributive information combined therewith.

FIG. 2C shows an example of a relationship between the ID codes and the corresponding items of the attributive information. Such a list of the ID codes is also held in the external equipment in a form of a look-up-table. In this embodiment, since the explanation is made as to the case where the attributive information of the music data recorded in the optical disk 107 includes four kinds of attributive information items, i.e., reproduction time, title, name of player and name of category, therefore each of the attributive information groups 204, 205 and 206 of the Musics a, b and c has a list structure of the attributive information contents as shown in FIG. 3A.

It is noted here that, although the entire contents of the attributive information are listed in the list construction 210 or 204 in this embodiment, only a necessary part of the contents may be developed in the attributive information list.

FIG. 4A shows an example of a data pattern format of the entire attributes item 202 of the disk as included in the entire list construction 201 shown in FIG. 2A, while FIG. 4B shows an example of the data pattern of each attributive information list structure (204, 205 and 206) of Musics a, b or c. That is, each of the data patterns shown in FIGS. 4A and 4B has a construction such that every information content block is appended with an ID code of e.g. two bytes length in the structure of the third stair layer of the data pattern shown in FIG. 12.

Figure 12:
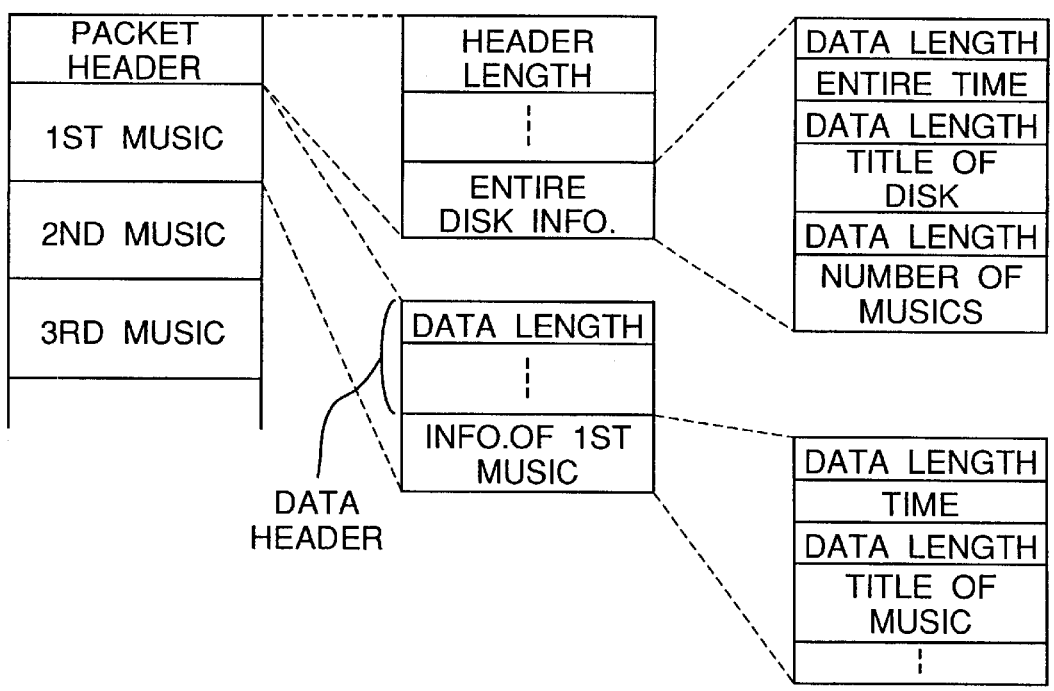
FIG. 12 is an explanatory diagram showing a conventional data pattern format of an attributive information list.

As an example of the list structure contained in the AV equipment, the attributive information list of music is standardized as Root Contents list which is comprised of descriptor length, list type, attributes, list specific information, # of entries, and Audio Track Objects, where the Audio Track Objects indicate the attributive information corresponding to each Music which corresponds to the second stair layer of the data pattern shown in FIG. 12. Meanwhile, the status information list is standardized as Disc Subunit Status Descriptor which is comprised of descriptor length, general disc status information block, destination plug status area information block, source plug status area information block and performance status area information block.

In the case where a command is applied to the apparatus 100 from the external equipment via the digital interface 108 requesting for reading out, e.g., the entire attributive information of the audio data recorded in the optical disk 107, the entire disk attribute list 201 as shown in FIG. 2A is produced by the list generator 109 and applied to the system controller 103.

In the case where the reading command is requesting for reading out, e.g., the individual attributive information 204 of Music a shown in FIG. 2A, the desired individual attributive information list (204) as shown in FIG. 3A is produced by the list generator 109 and applied to the system controller 103.

When the external equipment receives the thus generated information list from the apparatus 100, the kind (or item) of the attributive information contained in the list can be confirmed with reference to the ID codes appended thereto as shown in FIGS. 2C and 3A. Thus, it is not necessary to fix the description arrangement order of the attributive information items in the list 204 produced by the list generator 109, and other list 204a having different arrangement order of the attributive information items may be used as shown in FIG. 3B. Also, in this modified arrangement order case, the kinds (or items) of the attributive information can be confirmed with reference to the ID codes appended thereto similarly to the case shown in FIG. 3A.

As described above, the attributive information list has a construction of pairs of actual attributive information contents and corresponding ID codes appended thereto, and therefore even when items or kinds of the attributive information are newly added in the apparatus, the newly added information items can be confirmed by merely defining the ID codes corresponding thereto, which avoids the need of changing the list structure. Also, it is not necessary to fix the description arrangement order of the attributive information items, allowing the order to be easily changed.

Figure 5A:
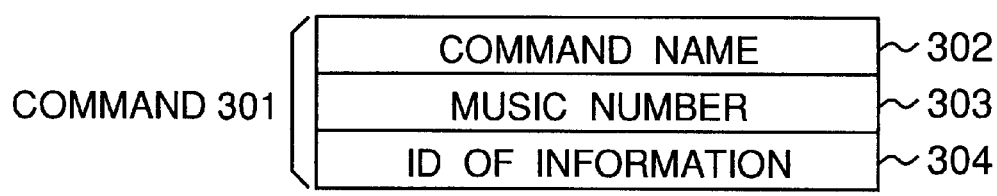
FIGS. 5A, 5B and 5C are explanatory diagrams showing a typical command and response structure.
Figure 5B:
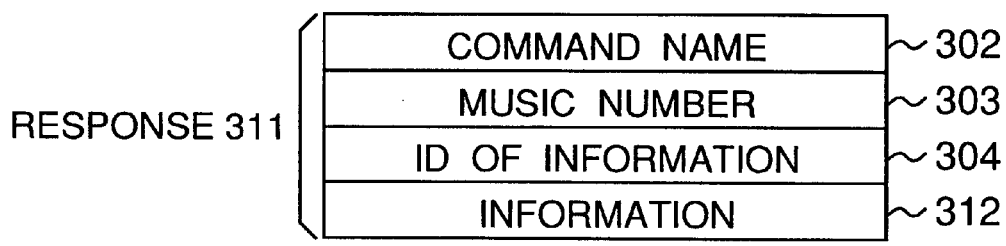
Figure 5C:
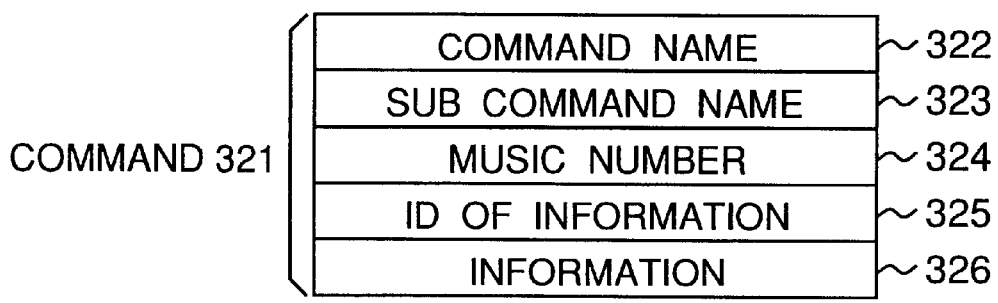

Next, the following describes a method of accessing (i.e., reading and/or writing) to the attributive information using command data including an ID code of the desired attributive information, where the command is transmitted to the apparatus 100 from an external equipment. As shown in FIGS. 5A and 5C, the command data (301, 321) includes a command name field (302, 322), data number field (303, 324) of data number to be accessed, and ID field (304, 325) of the desired attributive information.

When the data sender/receiver 105 of the apparatus 100 receives a packet including the command transmitted from the external equipment via the digital interface 108, the data sender/receiver 105 removes the header from the packet and transfers the command to the system controller 103. The system controller 103 analyzes the command and confirms as to what attributive information content is desired to be accessed and to what audio data the attributive information content belongs, based on the data number (i.e., music number) and ID code (304, 325) of the information contained in the command. Thus, the system controller 103 accesses the address position of the desired attributive information item in the list 210 produced by the list generator 109.

FIG. 5A shows an example of the command 301 for reading, and the following describes a method of reading attributive information using the command 301 including the auxiliary information ID field 304. The command data 301 is comprised of the fields of: command name 302, music number 303 and information ID 304. When the command 301 is for reading the attributive information, the command name 302 is indicated as e.g. READ. When a title 235 of the first music data 204 shown in FIG. 3A is desired to be read, the music number 303 is indicated as "1" and the attributive information ID 304 is indicated as "3" in view of the ID list shown in FIG. 2C.

When the data sender/receiver 105 of the apparatus 100 receives a packet including the command 301 transmitted from the external equipment via the digital interface 108, the data sender/receiver 105 removes the header from the packet and transfers the command to the system controller 103. The system controller 103 analyzes the command 301 and confirms that the received command is for reading the title (235) of the first music (204), based on the music number 303 being "1" and the attributive information ID 304 being "3". The system controller 103 obtains the desired information of the title (235) of the first music (204) from the attribute storage unit 102a by way of the list generator 109. Then, the system controller 103 produces a response 311 to the command 301 as shown in FIG. 5B using the above obtained title of the first music. The response 311 has a data format construction which is a combination of the command 301 added with the obtained attributive information 312 which is the title of the first music. The response 311 is appended with the header indicative of the destination address in the data sender/receiver 105, and the resultant packet including the response is transmitted to the external equipment via the digital interface 108.

It is noted that the command and response structure shown in FIGS. 5A and 5B are also applied to the case of transacting status information as the auxiliary information, similarly to the case of transacting the attributive information except for requiring the data number 303.

Next, the following describes a method of overwriting e.g. a category name of the second music using a command for writing as shown in FIG. 5C. In this example shown in FIG. 5C, the command 321 is comprised of fields of: a command name 322, subcommand name 323, music number 324, attributive information ID 325 and attributive information content 326 to be written. In this example, the command name is WRITE and the subcommand name is OVERWRITE, the music number 324 is "2" and the attributive information ID 325 is "6" in view of the ID list shown in FIG. 2C.

When the data sender/receiver 105 of the apparatus 100 receives a packet including the command 321 for writing transmitted from the external equipment via the digital interface 108, the data sender/receiver 105 removes the header from the packet and transfers the command to the system controller 103. The system controller 103 analyzes the command 321 and confirms that the command is for overwriting the category name (239) of the second music (205), based on the music number 324 being "2" and the attributive information ID 325 being "6". The desired attributive information content 326 is overwritten in the position of the category name (239) of the second music (205) in the list shown in FIG. 3A held in the list generator 109, under the control of the system controller 103. When the desired information content 326 is overwritten on the corresponding position in the list held in the list generator 109, the overwritten attributive information is applied to the attribute storage unit 102a. Accordingly, the desired category name of the second music is overwritten and updated in the corresponding position of the attribute storage unit 102a.

Thus, the command data adapted in the present embodiment is effective for the data transmission system of the present invention, and when the command data is for accessing an auxiliary information content of attributive or status information, the command includes a command name field (302, 322) indicative of the command content item and an ID-code field (304, 325) indicating an ID code number of the desired auxiliary information content to be accessed, whereby the desired auxiliary information content is identified in address position in the list and obtained by accessing.

As described above, according to the present invention, the list of the attributive information is produced by appending a corresponding ID code to each of the attributive information contents. When accessing the contents in the information list, the IED codes are used as an accessing or search key for obtaining the desired information to be read or written. Therefore, even when new attributive information item is increased, the contents of the increased information can be easily accessed by merely defining the ID codes corresponding to the newly added item while maintaining the essential structure of the list pattern format.

Moreover, since the ID codes are used as the accessing or searching key for the attributive information, it is not necessary to designate the address position in bytes from the top in the list as required in the conventional method, and therefore accessing to an erroneous position in the list can be effectively avoided, which assures the exact access to the desired information.

Moreover, since the access to the attributive information is performed using ID codes as a searching key, it can be omitted to first read the list and identify the position in bytes of the desired information in the list when in writing operation as required in the conventional method, and thus the data processing amount can be remarkably reduced.

Next, the following describes a method of inquiring the status information of the operation of the apparatus 100 from the external equipment via the digital interface 108. When the data sender/receiver 105 of the apparatus 100 receives a packet including the command for reading out the status information of the apparatus 100, the data sender/receiver 105 analyzes and removes the header from the packet and applies the command to the system controller 103. The system controller 103 analyzes the command and confirms that the command is for reading the status information. Then the status information held in the status storage unit 102b is read out and applied to the list generator 109 under the control of the system controller 103. Upon receipt of the status information, the list generator 109 converts the status information into a list format structure by appending specified ID codes to the corresponding status information items as shown in FIG. 6A. Thus, the desired status information is obtained in the list and applied to the system controller 103. The system controller 103 obtains the desired status information list from the status storage unit 102b by way of the list generator 109. Then, the desired status Information list is inputted to the data sender/receiver 105 and the list is made into a packet format by adding header thereto and the packet including the desired status information is returned to the external equipment via the digital interface 108. This operation is similar to that of reading the attributive information.

The list structure of the status information is shown in FIG. 6A, which is Similar to that shown in FIG. 2B or FIG. 3A. In this embodiment, the explanation is made for an example in the case where the status storage unit 102b holds the status information which includes the items of operation status 503, reproduction position 505, reproduction method 507, recording position 509 and recording method 511, and the list generator 109 produces the status information list 501 as shown in FIG. 6A.

FIG. 6B shows an example of a relationship between the status information items and the ID codes corresponding thereto. When the apparatus 100 is exclusively dedicated for a reproduction one, the status information does not include a recording position and recording method, and accordingly the list generator 109 produces a status information list structure 521 as shown in FIG. 6C.

A method of accessing the status information using an ID code serving as addressing key is similar to that of the attributive information as described above. That is, in the case where the command contains an ID code of status information desired to be accessed and is for accessing to read the desired status information in the status information list 501, the response to the command is produced by appending the obtained status information to the command, which is similar to that of the attributive information as described with reference to FIGS. 5A and 5B, except for requiring the music number field 303.

As described above, according to the present invention, the list of the status information is produced by appending a corresponding ID code to each of the attributive information contents. When accessing the contents in the information list, the ID codes are used as an accessing or search key for obtaining the desired information to be read or written. Therefore, it is not necessary to designate the address position in bytes from the top in the list as required in the conventional method, and accordingly the accessing to an erroneous position in the list can be effectively avoided, which assures the exact access to the desired information.

The following describes a method of responding to a command for inquiring what items of the auxiliary information of attributive and/or status information are contained in the list produced by the list generator 109. In order to obtain the list of the ID codes of the inquired attributive and/or status information held in the apparatus 100, a command 401 shown in FIG. 7A is transmitted from the external equipment to the apparatus 100 via the digital interface 108.

Figure 7A:
FIGS. 7A, 7B, 7C and 7D are explanatory diagrams showing a typical command and response structure.

As shown in FIG. 7A, the command 401 is comprised of a command name field 402 for identifying the content of the command and a list designation field 403 for designating an auxiliary information list containing the items of the auxiliary information stored in the apparatus. For example, when inquiring a list of the items of the attributive information contained in the attributive information list 204 of Music a, the list 204 shown in FIG. 2A is designated as the list designation field 403. In order to designate the list 204, the list number assigned thereto is used, or may be designated as a list of the attributive information of the first music. Similarly, when inquiring a list of the items of the status information contained in the status information list, the status information list 501 shown in FIG. 6A is designated as the list designation field 403.

When the data sender/receiver 105 of the apparatus 100 receives the list inquiring command 401, the data sender/receiver 105 analyzes and removes the header from the packet and applies the command to the system controller 103. The system controller 103 analyzes the command 401 and confirms that the command is for inquiring a list of the items of the attributive information contained in the individual attributive information list (204). Then, the system controller 103 requests the list generator 109 to produce a list of the ID codes contained in the individual list 204 of the attributive information of Music a held in the storage unit 102a, and then the required ID codes are applied to the list generator 109 under the control of the system controller 103. Upon receipt thereof, the list generator 109 produces the list of the ID codes of the attributive information of Music a, which the resultant ID codes list is sent to the system controller 103.

Figure 7B:
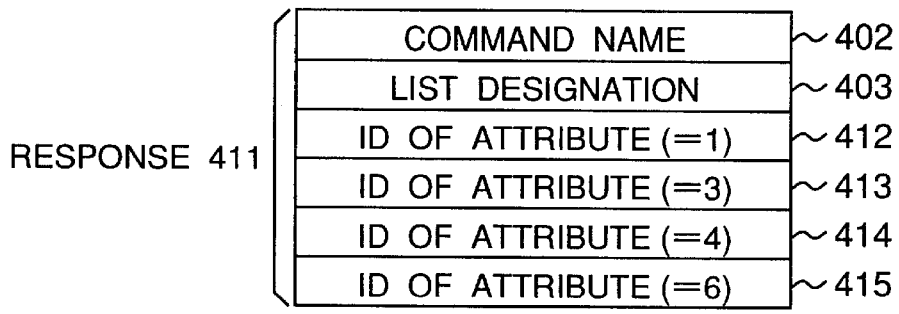

In this case, since the attributive information of Music a includes the items of: reproduction time, title, player name, and category name as shown in FIG. 3A, the list of the ID codes corresponding to these attributive information items includes "1", "3", "4" and "6" in view of FIG. 2C. Upon receipt of the list of the above ID codes, the system controller 103 produces a response 411 to the command 401 as shown in FIG. 7B, where the response 411 has a data pattern format constructed by adding to the command 401 with the list of the ID codes 412 to 415, i.e., "1", "3", "4" and "6" corresponding to the attributive information items of Music a. Thus produced response 411 is made into a packet form by adding a header indicating a destination address and sent to the external equipment via the digital interface 108.

Similarly, when inquiring a list of the items of the status information contained in the status information list 501, the list 501 shown in FIG. 6A is designated as the list designation field 403.

In this case, the status information is extracted from the status storage unit 102b to form a list of the ID codes corresponding to the items of the status information, and the resultant list of the ID codes is transferred to the system controller 103.

Figure 7C:
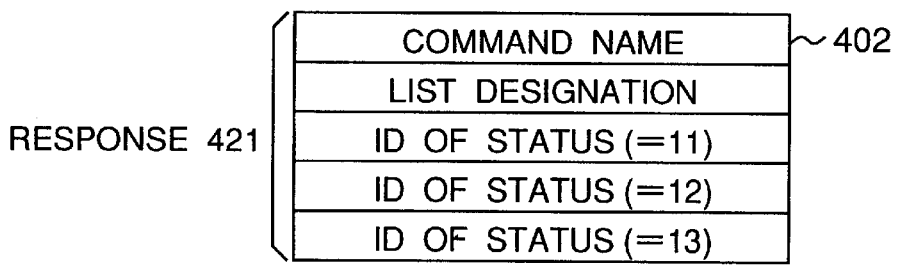

When the status information held in the status storage unit 102b includes the items of: operation status, reproduction position and reproduction method, the list of the ID codes is comprised of "11", "12" and "13" in view of FIG. 6B. Upon receipt of the list of ID codes from the list generator 109, the system controller 103 forms a response 421 to the command as shown in FIG. 7C.

Next, when inquiring a list of the items of the attributive and status information contained in the entire auxiliary information lists, the entire list held in the apparatus is designated as the list designation field 403 of the command 401. In this case, the entire attributive and status information are extracted from the attribute and status storage units 102a and 102b to thereby form a list of ID codes corresponding to the entire auxiliary information in the list generator.

Figure 7D:
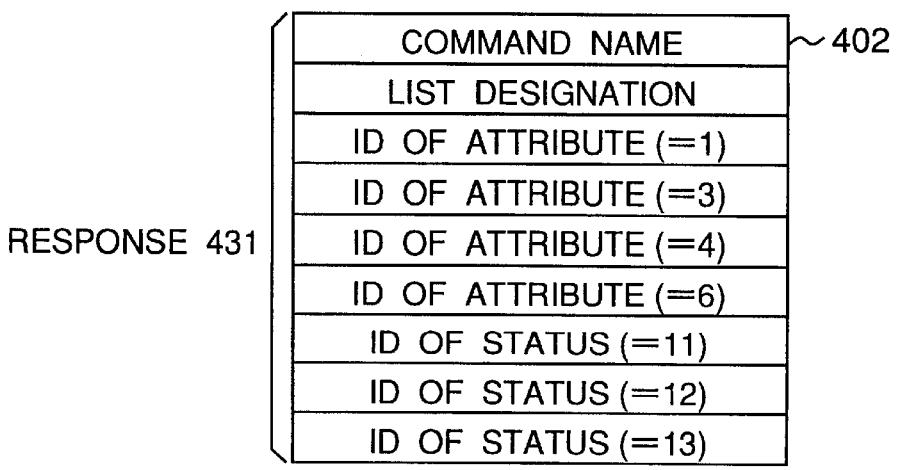

In this example, since the attributive information held in the attribute storage unit 102a includes the items of: reproduction time, title, player name and category name while the status information held in the status storage unit 102b includes the items of: operation status, reproduction position and reproduction method, therefore a list consisting of attribute ID codes "1", "3", "4" and "6" in combination with status ID codes "11", "12" and "13" is produced by the list generator 109. Upon receipt of the list of ID codes, the system controller 103 forms a response 431 to the command as shown in FIG. 7D.

As described above, when the apparatus 100 receives a command of inquiring the auxiliary information of attributive and/or status information contained in the list produced by the list generator 109, a list of ID codes corresponding to the inquired information is produced and then a response to the command is formed with use of the produced list of ID codes added to the command.

It is noted here that the inquiring command and response can be performed for a necessary part as well as the entire part of the attributive and status information held in the apparatus, and the list of ID codes can be formed in accordance with the range of the inquiring command.

Accordingly, in order to confirm a part or entire attributive and/or status information held in the apparatus 100, it can be avoided to directly read out the every attributive and/or status information held in the apparatus allowing to easily confirm the items of the information held in the apparatus, which remarkably reduces the processing amount in the apparatus 100 and the external equipment and also reduces the traffic amount between the apparatus 100 and the external equipment on the digital interface.

It is noted that, although an optical disk is used as a recording medium in this embodiment, it is not limited to this and other data recording mediums such as magnetic disk, magnetic recording tape and the like can be used so long as the medium records the data management attributive information.

Also, in this embodiment, although audio data is treated as the substantive main data, video data and other static image data can be utilized.

Moreover, in this embodiment, although the attributive and status information held in the auxiliary data storage portion 102 are converted to a list pattern format by means of the list generator 109, the attributive and status information can be stored in a list pattern format in the auxiliary data storage portion 102 including the list generator 109.

Moreover, in the present embodiment, although the examples of the lists of the attributive information and status information are shown as illustrated in FIGS. 2A, 2B and FIGS. 6A and 6C, other items can be included in the lists, for example, recorded date and time, writer and composer names, icon data and the like as the attributes, and I/O level as the other status information.

Moreover, in the present invention, although ID codes are appended to all items of the attributive and status information, the ID codes can be appended to a part of the attributive and status information and also one ID code can be appended to a plurality of items of the auxiliary information.

Moreover, in the present invention, although the list structures shown in FIGS. 2B and 6A are used, other list structures can be used, and although the title, player name and category name are used in the text data, other data such as character code and character length can be included in the text data.

Moreover, in the present embodiment, the command data structure is not limited to those shown FIGS. 5A and 5C. When reading or writing attributive information using a command, it is not limited to one piece of attributive information in one operation, and a plural pieces of attributive information can be simultaneously read or written by describing a plurality of ID codes in one command.

Moreover, in the present invention, although the attributive information and status information are used as the auxiliary information to be accessed by the external equipment, it is not limited to these information and other auxiliary information can be utilized so long as the information can be accessed from the external equipment to the data transmission apparatus.

Moreover, in the present invention, although both attributive information and status information are managed in the apparatus, either of them can be held in the apparatus.

As described above, in the data transmission apparatus and method thereof according to the present invention, in the transmission between the apparatus and the external equipment, a list structure of the auxiliary information of transaction of the main data is used, which the list is produced by appending a corresponding ID code to each of the auxiliary information items, the ID codes previously assigned to the items of the auxiliary information. When accessing to the contents in the list, the ID codes are used as an accessing key for obtaining the desired auxiliary information. Therefore, even when an auxiliary information is increased, the items of the increased auxiliary information contents can be easily accessed merely by defining the ID codes corresponding to the newly added contents while maintaining the essential structure of the light pattern format. Also, it is not necessary to fix the arrangement order in writing of the auxiliary information and the order in the list can be optionally modified.

Moreover, since the ID codes are used as the accessing key for the auxiliary information, it is not necessary to designate the address position in bytes from the top in the list as required in the conventional method, and therefore accessing an erroneous position in the list can be effectively avoided, which assures the exact access to the desired auxiliary information. Moreover, since the access to the auxiliary information is performed using ID codes as a searching key, it can be omitted to first read the list and identify the position in bytes of the desired information in the list when in writing operation as required in the conventional method, and thus the processing amount of the data can be remarkably reduced.

In addition, in the data transmission apparatus of the present invention, when the auxiliary information such as attributive information recorded in the recording medium or status information of the operation condition of the apparatus is stored in a list structure, the list is produced by adding corresponding ID codes to actual auxiliary information items. And the accessing to the auxiliary information list is performed using the ID codes as the accessing key, and therefore the reading and writing of the auxiliary information can be easily conducted.

Furthermore, when command data is transmitted from the external equipment to the apparatus for inquiring what kinds of auxiliary information contents are stored in the apparatus, the apparatus produces a list of the ID codes of the attributive and status information stored in the apparatus and then the produced list of the ID codes are transmitted to the external equipment as a response to the command. The inquiring operation can be performed with regard to not only the entire of the attributive and status information but also a part thereof, and the list of the ID codes of the desired attributive and status information is made in accordance with the range of the inquiring contents of the command.

As described above, even when a user desires to obtain as to whether or not the data transmission apparatus holds optional auxiliary information contents, it is not necessary to directly read out the every desired information contents. Accordingly, the auxiliary information list held in the apparatus can be easily obtained by way of the external equipment. Thus, the data processing amount of the apparatus and the external equipment can be reduced together with reduction of the traffic amount on the digital interface.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A data transmission apparatus for sending main data recorded on a recording medium to an external equipment and receiving main data recorded on another recording medium from the external equipment via a digital interface based on command data sent from the external equipment, said apparatus comprising:

an auxiliary information storage means for storing items of auxiliary information related to a transaction of the main data, the auxiliary information including items of attributive information data from the recording medium, said attributive information being indicative of attributes of the main data recorded on the recording medium; and a list producing means for producing a list of the auxiliary information, based on the attributive information in said auxiliary information storage means, by appending a corresponding ID code to one or more of the items of the auxiliary information, wherein said ID codes correspond to the respective items of auxiliary information according to a table of correspondence between said ID codes and corresponding types of items of auxiliary information, respectively, said ID codes enabling access to a desired item of auxiliary information.

2. The apparatus as claimed in claim 1, wherein said list of auxiliary information includes a plurality of items of auxiliary information, each item having a data format construction including content of the auxiliary information of the item and the corresponding ID code appended to the item.

3. The apparatus as claimed in claim 2, wherein the command data includes a command for accessing the content of an item of auxiliary information and also includes an ID code field indicating an ID code of the item of auxiliary information to be accessed Prom said list by the command, said apparatus comprising:

accessing means for identifying an address position of the content of the item of auxiliary information to be accessed in the list based on the ID code of the item of auxiliary information to be accessed included in said ID code field, and for obtaining the content of the item of auxiliary information to be accessed by accessing the content at the identified address position in said list.

4. The apparatus as claimed in claim 3, wherein:

the command data includes an ID code of an item of attributive information data to be accessed by the command;

said accessing means identifies an address position of the content of the item of attributive information data to be accessed in said list based on the ID code of the item of attributive information data to be accessed, and obtains the content of the item of attributive information data to be accessed by accessing the content at the identified address position of the attributive information data in said list; and said list producing means generates a response to the command upon receipt of the command, said response being based on the attributive information data accessed by said accessing means, and said response having a data format of a combination of the command data and the obtained attributive information data.

5. The apparatus as claimed in claim 3, wherein:

the command data includes an ID code of an item of attributive information data to be written and the content of the item of attributive information data to be written, the command data having a data format including a command name field and an information content field containing the content of the item of attributive information data to be written;

the command for accessing includes a command to write the item of attributive information in said list; and said apparatus comprises means for writing the item of attributive information onto the address position of a corresponding item of attributive information in said list.

6. The apparatus as claimed in claim 3, wherein:

the auxiliary information includes items of status information each being indicative of a status of a transition of the main data in said apparatus;

the command data includes an ID code of an item of status information to be accessed;

said accessing means identifies an address position of the content of the item of status information to be accessed in said list based on the ID code of the item of status information to be accessed, and obtains the content of the item of status information to be accessed by accessing the content at the identified address position of the status information in said list; and said list producing means generates a response to the command upon receipt of the command, said response being based on the status information accessed by said accessing means, and said response having a data format of a combination of the command data and the obtained status information.

7. The apparatus as claimed in claim 6, wherein said list of auxiliary information includes a plurality of items of status information, each item having a data format construction including content of the status information of the item and the corresponding ID code appended to the item.

8. The apparatus as claimed in claim 2, wherein:

the command data includes a command for inquiring a list of the contents of the items of auxiliary information contained in said list of auxiliary information;

the command data comprises a command name field indicative of a command name and a list designation field for designating a list of the items; and said list producing means generates a response to the command by producing a list of the ID codes corresponding to the items contained in said list of auxiliary information, said response having a data format of a combination of the produced list of ID codes added to the command data.

9. The apparatus as claimed in claim 1, wherein the digital interface is a serial transmission system defined by IEEE 1394 standard, using AV/C commands and responses defined by IEC 61883 standard as a host transmission protocol.

10. The apparatus as claimed in claim 1, wherein:

the auxiliary information includes items of status information each being indicative of a status of a transaction of the main data in said apparatus; and the attribute indicated by the attributive information is title information.

11. A data structure of command data for use with a data transmission apparatus for sending main data recorded on a recording medium to an external equipment and receiving main data recorded on another recording medium from the external equipment via a digital interface based on said command data sent from the external equipment, wherein the data transmission apparatus comprises: an auxiliary information storage means for storing items of auxiliary information related to a transaction of the main data, the auxiliary information including items of attributive information data from the recording medium, the attributive information being indicative of attributes of the main data recorded on the recording medium; a list producing means for producing a list of the auxiliary information, based on the attributive information in the auxiliary information storage means, by appending a corresponding ID code to one or more of the items of the auxiliary information, wherein the ID codes correspond to the respective items of auxiliary information according to a table of correspondence between the ID codes and corresponding types of items of auxiliary information, respectively, the ID codes enabling access to a desired item of auxiliary information; and accessing means for identifying address positions of information to be accessed in the list and for obtaining the content of the information to be accessed by accessing the content at the identified address position in the list, said data structure of command data comprising:

a command for accessing the content of an item of auxiliary information; and an ID code field indicating an ID code of the item of auxiliary information to be accessed from the list by the command;

wherein said command data enables the accessing means to identify an address position of the content of the item of auxiliary information to be accessed in the list based on said ID code of the item of auxiliary information to be accessed included in said ID code field, and to obtain the content of the item of auxiliary information to be accessed by accessing the content at the identified address position in the list.

12. The data structure of command data as claimed in claim 11, comprising:

an ID code of an item of attributive information data to be accessed by said command;

wherein said command data enables the accessing means to identify an address position of the content of the item of attributive information data to be accessed in the list based on said ID code of the item of attributive information data to be accessed, and to obtain the content of the item of attributive information data to be accessed by accessing the content at the identified address position of the attributive information data in the list, and said command data enables the list producing means to generate a response to said command upon receipt of said command, the response being based on the attributive information data accessed by the accessing means, and the response having a data format of a combination of said command data and the obtained attributive information data.

13. The data structure of command data as claimed in claim 11, comprising:

an ID code of an item of attributive information data to be written;

the content of the item of attributive information data to be written;

a command name field; and an information content field containing the content of the item of attributive information data to be written;

wherein:

said command for accessing includes a command to write the item of attributive information in the list; and said command data enables the apparatus to write the item of attributive information onto the address position of a corresponding item of attributive information in the list.

14. The data structure of command data as claimed in claim 11, wherein the auxiliary information includes items of status information each being indicative of a status of a transaction of the main data in the apparatus, said data structure of command data comprising:

an ID code of an item of status information to be accessed;

said command data enabling the accessing means to identify an address position of the content of the item of status information to be accessed in the list based on said ID code of the item of status information to be accessed, and to obtain the content of the item of status information to be accessed by accessing the content at the identified address position of the status information in the list, and said command data also enables the list producing means to generate a response to said command upon receipt of said command, the response being based on the status information accessed by the accessing means, and the response having a data format of a combination of said command data and the obtained status information.

15. The data structure of command data as claimed in claim 11, comprising:

a command for inquiring a list of the contents of the items of auxiliary information contained in the list of auxiliary information;

a command name field indicative of a command name; and a list designation field for designating a list of the items;

wherein said command data enables the list producing means to generate a response to said command by producing the list of the ID codes corresponding to the items contained in the list of auxiliary information, the response having a data format of a combination of the produced list of ID codes added to said command data.

16. The data structure of command data as claimed in claim 11, wherein:

the auxiliary information includes items of status information each being indicative of a status of a transaction of the main data in the apparatus; and the attribute indicated by the attributive information is title information.

17. A data transmission method for sending main data recorded on a recording medium to an external equipment and receiving main data recorded on another recording medium from the external equipment via a digital interface based on command data sent from the external equipment, said method comprising:

storing items of auxiliary information related to a transaction of the main data, the auxiliary information including items of attributive information data form the recording medium, the attributive information being indicative of attributes of the main data recorded on the recording medium;

producing a list of the auxiliary information, based on the attributive information, by appending a corresponding ID code to one or more of the items of the auxiliary information, wherein the ID codes correspond to the respective items of auxiliary information according to a table of correspondence between the ID codes and corresponding types of items of auxiliary information, respectively; and accessing a desired items of auxiliary information based on the ID codes.

18. The method as claimed in claim 17, wherein the list of auxiliary information includes a plurality of items of auxiliary information, each item having a data format construction including content of the auxiliary information of the item and the corresponding ID code appended to the Item.

19. The method as claimed in claim 18, wherein the command data includes a command for accessing the content of an item of auxiliary information and also includes an ID code field indicating an ID code of the item of auxiliary information to be accessed from the list by the command, said method comprising:

identifying an address position of the content of the item of auxiliary information to be accessed in the list based on the ID code of the item of auxiliary information to be accessed included in the ID code field; and obtaining the content of the item of auxiliary information to be accessed by accessing the content at the identified address position in the list.

20. The method as claimed in claim 14, wherein the command data includes an ID code of an item of attributive information data to be accessed by the command, said method comprising:

identifying an address position of the content of the item of attributive information data to be accessed in the list based on the ID code of the item of attributive information data to be accessed;

obtaining the content of the item of attributive information data to be accessed by accessing the content at the identified address position of the attributive information data in the list; and generating a response to the command upon receipt of the command, the response being based on the attributive information data accessed by said accessing, and said response having a data format of a combination of the command data and the obtained attributive information data.

21. The method as claimed in claim 19, wherein:

the command data includes an ID code of an item of attributive information data to be written and the content of the item of attributive information data to be written, the command data having a data format including a command name field and an information content field containing the content of the item of attributive information data to be written;

the command for accessing includes a command to write the item of attributive information in the list; and said method comprises writing the item of attributive information onto the address position of a corresponding item of attributive information in the list.

22. The method as claimed in claim 19, wherein the auxiliary information includes items of status information each being indicative of a status of a transaction of the main data, and the command data includes an ID code of an item of status information to be accessed, said method comprising:

identifying an address position of the content of the item of status information to be accessed in the list based on the ID code of the item of status information to be accessed;

obtaining the content of the item of status information to be accessed by accessing the content at the identified address position of the status information in the list; and generating a response to the command upon receipt of the command, the response being based on the status information accessed by said accessing, and the response having a data format of a combination of the command data and the obtained status information.

23. The method as claimed in claim 22 wherein the list of auxiliary information includes a plurality of items of status information, each item having a data format construction including content of the status information of the item and the corresponding ID code appended to the item.

24. The method as claimed in claim 18, wherein the command data includes a command for inquiring a list of the contents of the items of auxiliary information contained in the list of auxiliary information, and the command data comprises a command name field indicative of a command name and a list designation field for designating a list of the items, said method comprising:

generating a response to the command by producing a list of the ID codes corresponding to the items contained in the list of auxiliary information, the response having a data format of a combination of the produced list of ID codes added to the command data.

25. The method as claimed in claim 18, wherein the digital interface is a serial transmission system defined by IEEE 1394 standard, using AV/C commands and responses defined by IEC 61883 standard as a host transmission protocol.

26. The method as claimed in claim 17, wherein:

the auxiliary information includes items of status information each being indicative of a status of a transaction of the main data in the apparatus; and the attribute indicated by the attributive information is title information.

* * * * *

UNITED STATES PATENT AND TRADEMARK OFFICE
CERTIFICATE OF CORRECTION

PATENT NO.    : 6,519,656 B2
DATED         : February 11, 2003
INVENTOR(S)   : Satoshi Kondo et al.

It is certified that error appears in the above-identified patent and that said Letters Patent is hereby corrected as shown below:

<u>Title page, Item [54] and Column 1, lines 1-5,</u>
Title, should be -- DATA TRANSMISSION SYSTEM FOR APPENDING A CORRESPONDING ID CODE TO RESPECTIVE ITEMS OF AUXILIARY INFORMATION AND GENERATING A LIST OF THE AUXILIARY INFORMATION --

<u>Title page,</u>
Item [56], FOREIGN PATENT DOCUMENTS, insert:

-- EP    0645928 --

<u>Column 16,</u>
Line 66, delete "Prom" and insert -- from --.

<u>Column 17,</u>
Line 42, delete "transition" and insert -- transaction --.

Signed and Sealed this

Twelfth Day of August, 2003

JAMES E. ROGAN
*Director of the United States Patent and Trademark Office*